(12) United States Patent
Perez

(10) Patent No.: US 8,352,618 B2
(45) Date of Patent: Jan. 8, 2013

(54) METHOD AND SYSTEM FOR RESOLVING CONFLICTS BETWEEN IPSEC AND IPV6 NEIGHBOR SOLICITATION

(75) Inventor: Maria Perez, Half Moon Bay, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 580 days.

(21) Appl. No.: 12/649,835

(22) Filed: Dec. 30, 2009

(65) Prior Publication Data

US 2011/0161665 A1   Jun. 30, 2011

(51) Int. Cl.
*G06F 15/16* (2006.01)
(52) U.S. Cl. .................. 709/227; 709/228; 709/230
(58) Field of Classification Search .................. 709/227, 709/228, 230
See application file for complete search history.

(56) References Cited

U.S. PATENT DOCUMENTS

| 7,685,434 B2 * | 3/2010 | Kaniz et al. ............ 713/189 |
| 8,166,205 B2 * | 4/2012 | Farinacci et al. ............ 709/249 |
| 2007/0047549 A1 * | 3/2007 | Park ............................ 370/392 |

* cited by examiner

*Primary Examiner* — Phuoc Nguyen
(74) *Attorney, Agent, or Firm* — Buchanan Ingersoll & Rooney PC

(57) ABSTRACT

A method of enabling host devices having an IPsec policy to communicate with one another via an IPv6 communication network, which includes the following steps: extracting a Media Access Control identifier (MAC ID) for a target host from a security policy for an IPv6 address for the target host; searching for the MAC ID of the target host in an Address Resolution Protocol (ARP) table on a source host; upon locating the MAC ID of the target host, creating a temporal neighbor cache entry in a neighbor cache table for the target host; and enabling a security association between the source host and the target host based on the temporal neighbor entry in the neighbor cache table, which allows IPv6 communications to be exchanged between the target host and the source host.

19 Claims, 3 Drawing Sheets

METHOD AND SYSTEM FOR RESOLVING CONFLICTS BETWEEN IPSEC AND IPV6 NEIGHBOR SOLICITATION

FIELD OF THE INVENTION

The present invention relates to a method and system for resolving conflicts between IPsec and IPv6 Neighbor Solicitation, and more particularly to a method and system of using Address Resolution Protocol (ARP) for neighbor discover IP security (IPsec) in an IPv6 network (Internet Protocol version 6).

BACKGROUND OF THE INVENTION

Networks have enhanced our ability to communicate and access information by allowing one personal computer to communicate over a network (or network connection) with another personal computer and/or other networking devices, using electronic messages. When transferring an electronic message between personal computers or networking devices, the electronic message will often pass through a protocol stack that performs operations on the data within the electronic message (e.g., packetizing, routing, flow control).

The first major version of addressing structure, Internet Protocol Version 4 (IPv4), is still the dominant protocol of the Internet, although the successor, Internet Protocol Version 6 (IPv6) is being deployed actively worldwide. It is anticipated that the transition between IPv4 Internet and an IPv6-based Internet will be a long process during which both protocol versions will coexist. Specifically, during the gradual transition, existing IPv4 applications will be able to work with the newer IPv6 enabled application using a dual-stack, which includes both an IPv4 protocol stack and an IPv6 protocol stack.

The IPv6 network protocol provides that IPv6 hosts or host devices (e.g., image forming apparatuses and other devices) can configure themselves automatically (i.e., stateless address autoconfiguration) when connected to an IPv6 network using ICMPv6 neighbor discovery messages (i.e., Neighbor Discovery Protocol or NDP). When first connected to a network, an IPv6 host sends a link-local multicast neighbor solicitation request advertising its tentative link-local address for double address detection (dad) if no problem is encountered the host uses the link-local address. The router solicitations are sent (or router advertisements are received depending on timing) to obtain network-layer configuration parameters, and routers respond to such a request with a router advertisement packet that contains network-layer configuration parameters.

However, the Neighbor Discovery Protocol (NDP) specifications call for the use of IPsec to protect NDP messages, which can present problems for hosts (or host devices). Specifically, IPsec can only be used with a manual configuration of security associations, due to bootstrapping problems in using IKE (Internet Key Exchange), since establishing the required session to send NDP messages first requires the prior exchange of NDP messages in order to enable delivery of any IPv6 packets. In addition, it can be appreciated that the solution of manually configured IPsec sessions is not feasible for the typical number of hosts in a network. Furthermore, the number of manually configured security associations needed for protecting NDP can be very large, making that approach impractical for most purposes.

Thus, one solution to the above-mentioned problem has been the use of the SEcure Neighbor Discovery (SEND) protocol, which is a security extension of the Neighbor Discovery Protocol (NDP) in IPv6. SEcure Neighbor Discovery (SEND) provides a mechanism for securing NDP with a cryptographic method that is independent of IPsec, the original and inherent method of securing IPv6 communications.

SUMMARY OF THE INVENTION

In consideration of the above issues, it would be desirable to have an alternative solution to SEND, wherein an application associated with a host and/or network device such as an image forming apparatus, resolves the conflict between IPSec and IPv6 Neighbor Solicitation using an Address Resolution Protocol for neighbor solicitation.

In accordance with an exemplary embodiment, a method of enabling host devices having an IPsec policy to communicate with one another via an IPv6 communication network, comprises: extracting a Media Access Control identifier (MAC ID) for a target host from a security policy for an IPv6 address for the target host; searching for the MAC ID of the target host in an Address Resolution Protocol (ARP) table on a source host; upon locating the MAC ID of the target host, creating a temporal neighbor cache entry in a neighbor cache table for the target host; and enabling a security association between the source host and the target host based on the temporal neighbor entry in the neighbor cache table, which allows IPv6 communications to be exchanged between the target host and the source host.

In accordance with another exemplary embodiment, a system of neighbor discovery for an IPv6 communication network, comprises: a source host having an application which performs the following steps: extracting a Media Access Control identifier (MAC ID) for a target host from a security policy for an IPv6 address for the target host; searching for the MAC ID of the target host in an Address Resolution Protocol (ARP) table on a source host; upon locating the MAC ID of the target host, creating a temporal neighbor cache entry in a neighbor cache table for the target host; and forwarding an Address Resolution Protocol (ARP) request to the target host, the ARP request having a Media Access Control Identifier (MAC ID) associated with the source host; and a target host having an application, which performs the following steps: receiving the ARP request on the target host; comparing the MAC ID of the source host with a local ARP table associated with the target host; and if the MAC ID of the source host matches a MAC ID on the local ARP table of the target host, creating a temporal neighbor cache entry in a neighbor cache table associated with the target host.

In accordance with a further exemplary embodiment, a computer readable medium containing a computer program for neighbor discovery for an IPv6 communication network, wherein the computer program comprises executable instructions for: extracting a Media Access Control identifier (MAC ID) for a target host from a security policy for an IPv6 address for the target host; searching for the MAC ID of the target host in an Address Resolution Protocol (ARP) table on a source host; upon locating the MAC ID of the target host, creating a temporal neighbor cache entry in a neighbor cache table for the target host; and enabling a security association between the source host and the target host based on the temporal neighbor entry in the neighbor cache table, which allows IPv6 communications to be exchanged between the target host and the source host.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
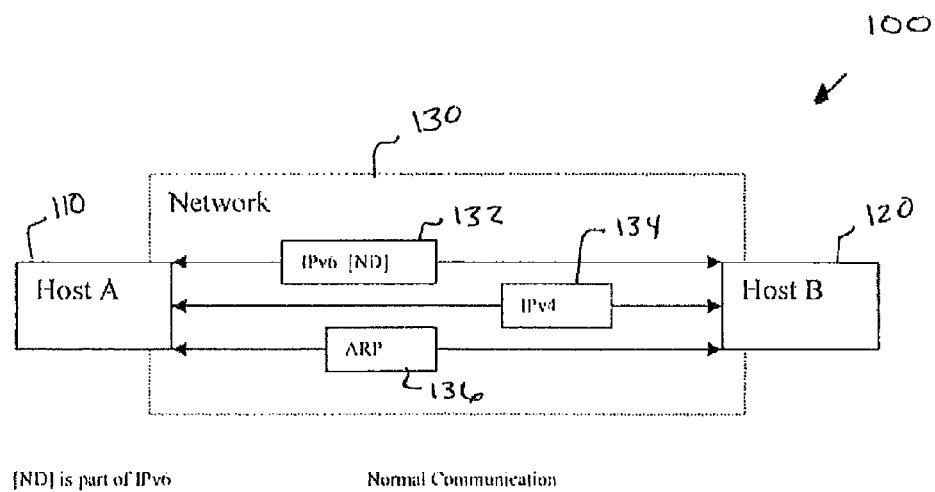
FIG. 1 is an illustration of a network system with a normal communication protocol in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

FIG. 1 shows a network system 100 having a normal communication protocol, which includes a host device (Host A) 110 in the form of an image forming apparatus in accordance with an exemplary embodiment. As shown in FIG. 1, the network system 100 is composed of a host device (or an image forming apparatus) 110 and at least one second host or client device (Host B) 120. The host device (or image forming apparatus) 110 and the at least one second host (or client device) 120 are connected to each other through a communication network 130 in a state capable of performing data communications. It can be appreciated that the hosts 110, 120 can be any network device which supports ARP, IPv4, IPsec and IPv6. Examples of communication networks 130 consistent with embodiments of the invention include, but are not limited to, the Internet, an Intranet, a local area network (LAN) and a wide area network (WAN). The host device (or image forming apparatus) 110 and the second host (or client device) 120 can be connected with a wire or can be connected with a wireless connection by using radio frequency (RF), infrared (IR) transmission, USB, IEEE1394 and/or other suitable wireless technology.

In accordance with an exemplary embodiment, the communications network 130 as shown in FIG. 1, includes an IPv6 (Internet Protocol version 6) 132, an IPv4 (Internet Protocol version 4) 134, and a third computer networking protocol in the form of an Address Resolution Protocol (ARP) 136. In accordance with an exemplary embodiment, the IPv6 132 includes a neighbor discovery protocol. It can be appreciated that upon exchange of ARP packets between hosts 110, 120, the packets will contain the MAC-ID and IPv4 address of the hosts 110, 120, and which is independent of IPv6.

It can be appreciated that in accordance with an exemplary embodiment, the host device (or image forming apparatus) 110 may be embodied by a printer, a Multi-Function Peripheral (MFP) and other known image forming apparatuses, which prints an image on a printing medium (or a recording medium) such as a sheet of paper based on printing data generated by the at least one second host (or client device) 120. In accordance with an exemplary embodiment, the host device (or image forming apparatus) 110 is a Multi-Function Peripheral (MFP), which includes at least a copy function, an image reading function, and a printer function, and forms an image on a sheet based on a print job (print instruction) sent from the at least one second host (or client device) 120, image data read by an image reading section, such as a scanner, provided in the host device (or image forming apparatus) 110, or the like.

In accordance with an embodiment, the at least one second host (or client device) 120, which may be embodied by a computer system, and generates the printing data usable in the host device (or image forming apparatus) 110 and transmits the generated printing data to the host device (or image forming apparatus) 110. An example of the at least one second host (or client device) 120 may include a computer and/or a portable device such as a notebook personal computer, a cellular phone and a personal digital assistant (PDA). The host device (or image forming apparatus) 110 and the at least one second host (or client device) 120 can constitute an image forming system to install a communication port, to generate printing data, and to perform a printing operation of forming an image on a printing medium according to the printing data.

It can be appreciated that the at least one second host devices (or client device) 120 can be a plurality of personal computers, and has the function of sending a print job to the first host device 110 in the form of an image forming apparatus. A printer driver program (hereinafter, sometimes simply referred to as a printer driver) is installed in the second host 120, and the second host 120 uses the function of the printer driver to generate a print job including the data of print conditions to be applied at the time of image formation, image data, and the like, and to send the generated print job to the first host device 110 in the form of an image forming apparatus.

Figure 2:
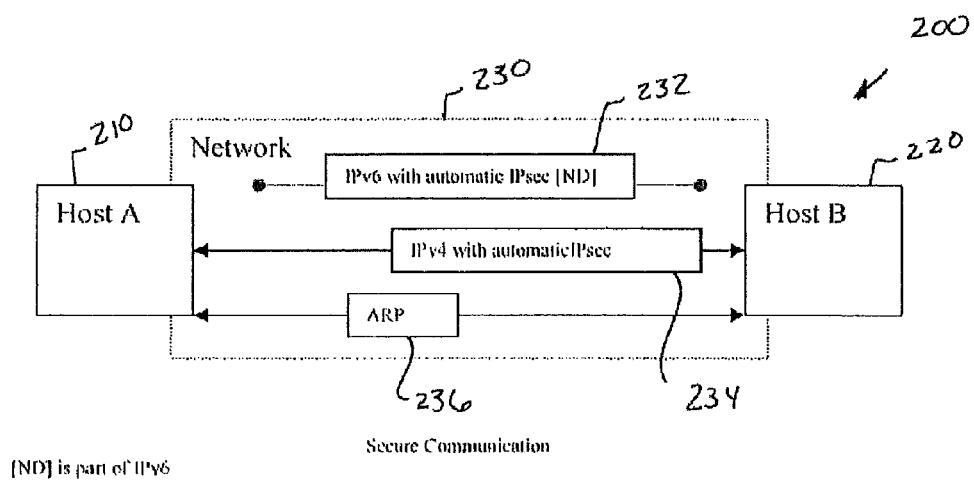
FIG. 2 is an illustration of a network system with a secure IPv6 communication protocol in accordance with another exemplary embodiment.

FIG. 2 is an illustration of a network system 200 with a secure IPv6 communication protocol in accordance with another exemplary embodiment. As shown in FIG. 2, the system 200 includes a host device or source host (Host A) 210, a least one second host or target/destination host (Host B) 220, and a communication network 230 in a state capable of performing data communications. In accordance with an exemplary embodiment, the communications network 230 as shown in FIG. 2, includes an IPv6 (Internet Protocol version 6) 232 with automatic IPsec, an IPv4 (Internet Protocol version 4) 234 with automatic IPsec, and an Address Resolution Protocol (ARP) 236. In accordance with an exemplary embodiment, the IPv6 232 includes a neighbor discovery protocol. However, as a result of the security policies of the IPv6 network, including the IPsec security, the hosts 210, 220 (host A and host B) are unable to communicate with other because the mechanism for translation of IPv6 addresses into link-layer addresses (and IPv4 addresses) is performed using the Neighbor Discovery Protocol (NDP).

In accordance with an exemplary embodiment, one solution to this problem is through an application (or software module), which uses Address Resolution Protocol (ARP) table information to establish a MAC ID match of hosts (or nodes) 210, 220. It can be appreciated that upon matching of MAC IDs with the ARP table, the application creates a temporal neighbor cache entry in a neighbor cache table for each of the hosts (or nodes) 210, 220. Once the temporal neighbor cache entry in the neighbor cache table is established, the corresponding security associations can be created and the IPsec negotiation established. In accordance with another exemplary embodiment, the application can remove the cache entry from one or both of the neighbor cache tables upon establishment of the IPv6 connection between the two hosts 210, 220.

In accordance with an exemplary embodiment, if the hosts (Host A and Host B) 210, 220 have an IPsec policy, which requires a complete secure IPv6 communication between each host, the IPv6 network protocol provides that IPv6 hosts or host devices (e.g., image forming apparatuses and other devices) can configure themselves automatically (i.e., stateless address autoconfiguration) when connected to an IPv6 network using ICMPv6 neighbor discovery messages (i.e., Neighbor Discovery Protocol or NDP). Typically, in an IPv6 network connection, when first connected to the network, the IPv6 host sends a link-local multicast neighbor solicitation request advertising its tentative link-local address for double address detection (dad), and if no problem is encountered the host uses the link-local address. However, due to the IPsec policy, the two hosts 210, 220 will not be able to exchange NDP messages in order to enable delivery of any IPv6 packets.

In accordance with an exemplary embodiment, each of the hosts 210, 220 includes an application, which performs an IPv4 Address Resolution Protocol (ARP) exchange to establish the necessary security associations to allow the negotiation of IPsec between the hosts (or nodes). It can be appreciated that in accordance with an exemplary, the ARP tables of the hosts 210, 220 can be pre-populated with the MAC ID of other hosts (or nodes) upon which appropriate security protocols have been established between hosts (or nodes) 210, 220.

In accordance with another exemplary embodiment, each of the hosts (or nodes) 210, 220 has an application, which derives the Media Access Control (MAC ID) from the IPv6 addresses generated by the stateless address autoconfiguration protocol. It can be appreciated that the application can derive the MAC ID from the given IPv6 address or derive the IPv6 address from the MAC ID in an ARP table. When there is a MAC ID match, the application will create a temporal neighbor cache entry in the neighbor cache table. In accordance with an exemplary embodiment, IPsec negotiation proceeds once the corresponding security associations have been created.

In accordance with a further exemplary embodiment, if a first host 210 (e.g., Host A) IPsec policy does not have a defined second host 220 (e.g., Host B) IPv6 address (meaning all traffic must be secured), the application will check that a security association for IPv6 has been created for each MAC ID in the ARP table and the previous procedure for setting a IPv6 secure communication is followed.

In accordance with an exemplary embodiment, the IPv6 Neighbor Discovery can be performed using the IPv4 ARP protocol, since it enables the physical address of a network interface card corresponding to an IP address, which is known. It can be appreciated that each and every device or apparatus connected to a network has a 48 bit identification number (or MAC ID). However, communications over the Internet do not directly use the MAC ID since the hosts' addresses would need to be changed each time a network interface card is changed, but instead uses a logical address allocated by the system, i.e., the IP address. Accordingly, the physical addresses can be linked to the logical addresses, such that using the IPv4 ARP protocol interrogates the network machines to find out their physical address, then creates a lookup table between the logical and physical addresses in a cache memory.

It can be appreciated that typically when one host needs to communicate with another host, the first host consults the lookup table. Typically, if the requested address is not found in the table, the ARP protocol issues a request over the network. Each of the hosts on the network will compare this logical address to theirs. If one of them identifies with this address, the host will respond to the IPv4 ARP request, which will store the address pair in the lookup table and an IPv6 communication will then be able to take place between hosts 210, 220.

In accordance with an exemplary embodiment, a first host device (or source hosts) 210 having an ARP table encapsulates a MAC ID within an ADP request. The first host device 210 broadcasts the packet with the ARP request into a broadcast domain to which the target host 220 is attached. The target host 210 with a particular MAC ID address identifies itself and provides the recipient's hardware address to the requester. It can be appreciated that this process is known as resource discovery.

The ARP request contains the destination station's IP address (for source hosts or source devices) or the IP address of the default router (for target hosts or remote devices). The intended node replies with its MAC address encapsulated within an ARP response. The local hosts (or source hosts) uses this information to resolve the destination MAC address of the frame. To minimize unnecessary traffic, the mappings between an IP address and a MAC address are stored locally in an ARP cache. The ARP cache is maintained for a prescribed period depending on the implementation of the TCP/IP protocol.

In order to increase the efficiency of the network and not tie up bandwidth involved in ARP broadcasting, each hosts 210, 220 keeps a table of IP addresses and matching MAC ID addresses in a memory (or memory arrangement), i.e., an ARP cache. Before sending a broadcast, the sending host (or host device) 210, 220 will check to see if the information is in its ARP cache. If the MAC ID of the target host 220 is in the ARP cache of the source host 210, the source host 210 can complete the ARP data packet without an ARP broadcast.

The Network layer routes messages back and forth between a source device (or source host) 210 and a destination device (or target host) 220 according to Internet Protocol (IP) addresses by adding an IP header to each packet indicating the source and destination IP addresses. It can be appreciated that the lowest layer is the physical link layer in which the hardware MAC addresses are used. Accordingly, in a IPv4 network, since the ARP protocol is below the IPv4 and IPv6 network layer, the hosts 210, 220 can communicate with one another without initially enabling IPsec.

It can be appreciated that maintaining unique MAC ID and IP addresses for each host or device is critical for proper functioning of a communication network. MAC ID or (MAC addresses) are 48 bits in length while IP addresses are 32 bits in length. The MAC ID (or MAC address) is a hardware address, which is not readily changeable and is assigned according to the manufacturer in the manner of a serial number. Thus, duplicate MAC addresses rarely present any problem in actual applications.

When a source host (or device) 210 has information to communicate to a target host (or node) 220, the dynamic nature of the IP address allocation requires that the current IP address of the target host or device 220 be mapped to its MAC address. This mapping is achieved by the source host (or node) 210 sending an ARP request which is broadcast to all devices on the network, and which requests that the device having the target IP address respond with its MAC address. Normally, only one such target host (or node) 220 will respond and the communication session can then begin.

In addition, any IPv6 capable device with stateless addressing including hosts 210, 220 in the form of image forming apparatuses (e.g., Multi-Function Peripherals (MFP) and printers) typically will include an unique identifier or Media Access Control address (MAC address). The MAC address is assigned to network adapters or network interface cards (NICs) by the manufacturer for identification, and used in the Media Access Control protocol sublayer of the Internet Protocol Version 6 (IPv6). If assigned by the manufacturer, a MAC address usually encodes the manufacturer's registered identification number. It can be appreciated that the MAC address can also be known as an Ethernet Hardware Address (EHA), hardware address, adapter address, or physical address.

Meanwhile, the use of the Internet Protocol Security (or IPsec) provides a protocol suite for securing Internet Protocol (IP) communications by authenticating and encrypting each IP packet of a data stream. In addition, IPsec also includes protocols for establishing mutual authentication between agents at the beginning of the session and negotiation of cryptographic keys to be used during the session. For example, IPsec can be used to protect data flows between a pair of hosts 210, 220 (e.g. computer users or servers), between a pair of security gateways (e.g. routers or firewalls), or between a security gateway and a host 210, 220.

Figure 3:
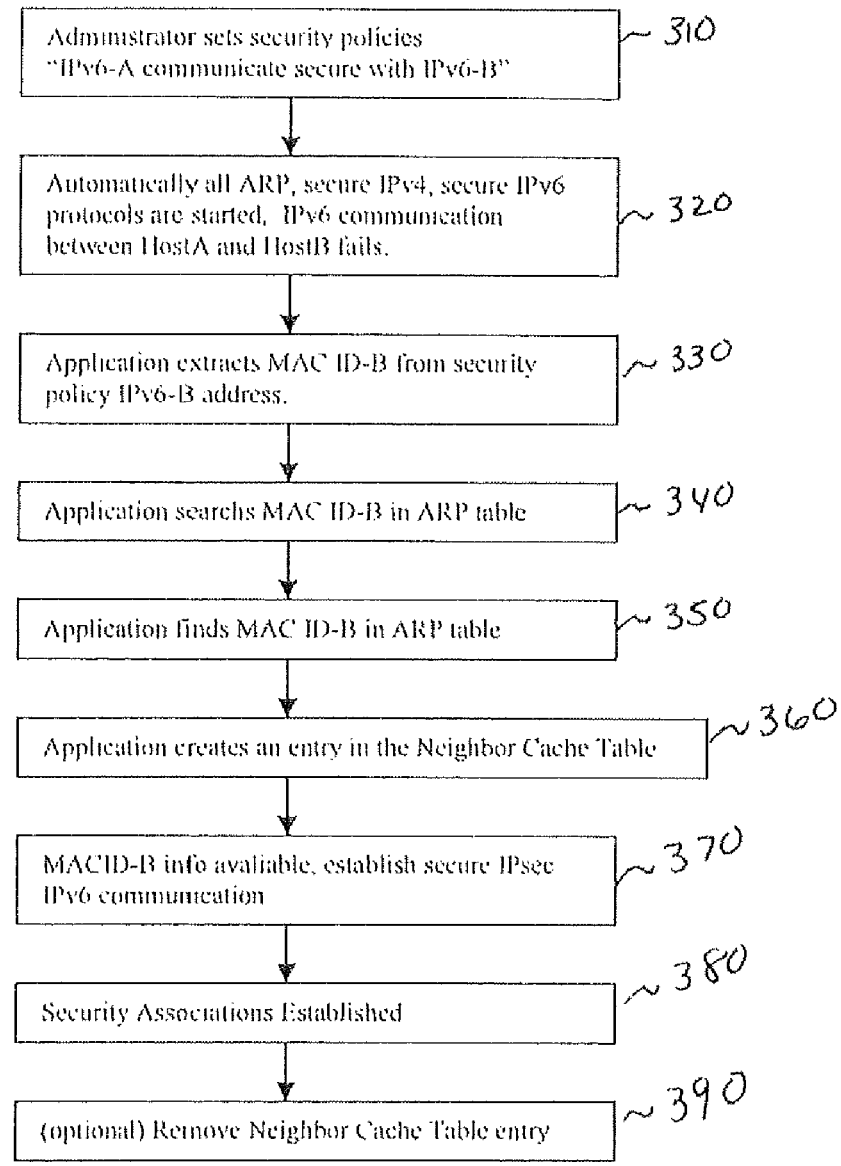
FIG. 3 is a flow chart of an implementation of an application, which uses Address Resolution Protocol (ARP) to resolve the conflict between IPSec and IPv6 neighbor solicitation in accordance with an exemplary embodiment.

FIG. 3 is a flow chart of an implementation of an application, which uses IPv4 Address Resolution Protocol (ARP) for neighbor discovery in accordance with an exemplary embodiment for a network connection which has both IPv4 and IPv6 interoperability. In accordance with an exemplary embodiment, the system 300 includes a pair of hosts (Host A and Host B), which are both IPv6 and IPsec enabled.

In accordance with an exemplary embodiment, Host A has a cache (or local data base) of MAC address of other hosts (or nodes) and maps the MAC address to the other hosts (or nodes) IP address. As shown in FIG. 3, in a first step 310, an administrator sets a security policy, which requires that Host A and Host B communicate via a secure IPv6 network communication (i.e., "IPv6-A communicate secure with IPv6-B"). As a result thereof, in step 320, automatically all ARP, secure IPv4, secure IPv6 protocols are started, however, any communication between Host A and Host B will fail as a result of Host A and Host B refusing to acknowledge packets from one another per the IPv6 protocols.

In step 330, an application associated with Host A, extracts the MAC ID for Host B from security policy IPv6-Host B address. It can be appreciated that the MAC ID for Host B can be generated from either the IPv6 address as generated by the stateless autoconfiguration protocol (IPv6), or alternatively, can be obtained using the IPv6 address of Host B via an ARP table. The application searches for the MAC ID of Host B in the ARP table (step 340), and if the MAC ID of Host B is in the ARP table, the MAC ID of Host B is then located and/or found in step 350. In step 360, the application associated with Host A, creates a temporal Neighbor Cache entry in the Neighbor Cache table for Host B. In step 370, since the MAC ID information for Host B is available, Host A and Host B can establish a secure IPsec communication based on the MAC ID of Host B as found in the Neighbor Cache table for Host A.

Once the security associations have been established as shown in Step 380, a secure IPv6 communication between Host A and Host B can be established. In accordance with an optional step 390, the Neighbor Cache table entry can be removed from one or both of the hosts, upon establishment of the secure IPv6 communication between Host A and Host B.

Figure 4:
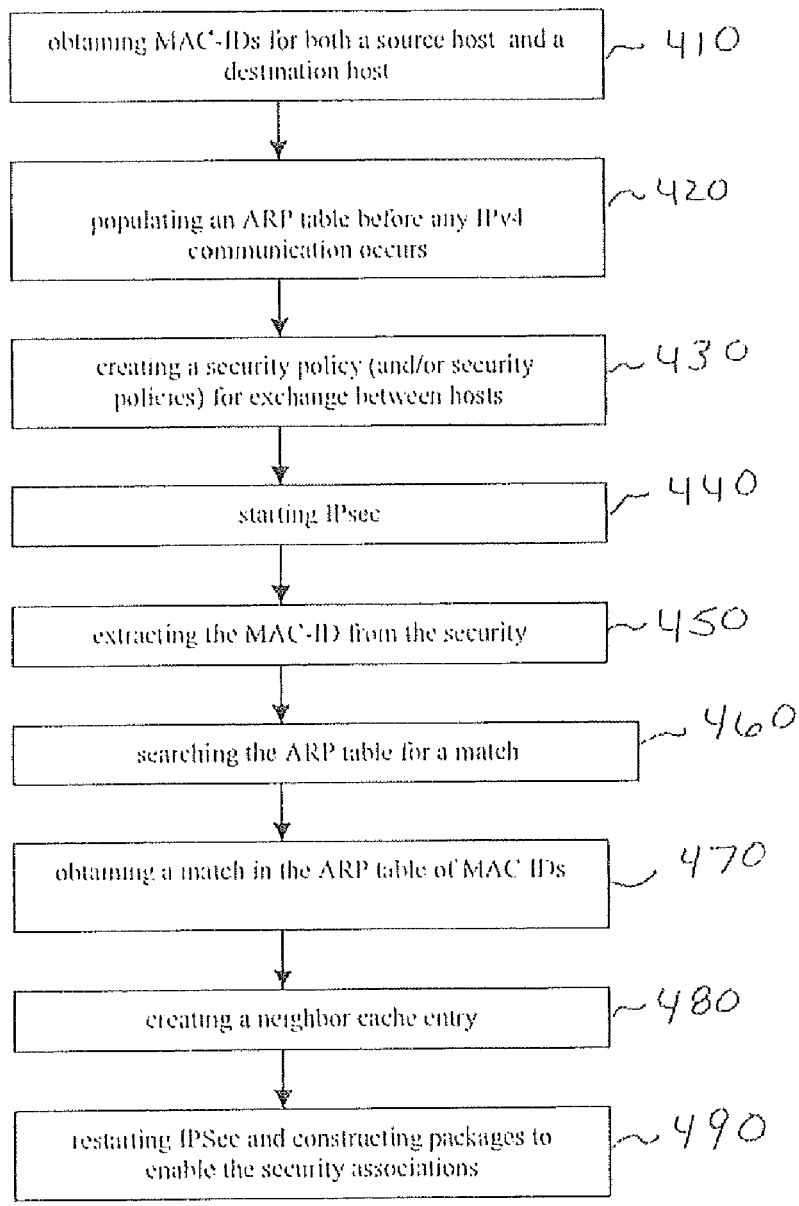
FIG. 4 is a flow chart showing another exemplary embodiment of an implementation of an application, which uses Address Resolution Protocol (ARP) to resolve the conflict between IPsec and IPv6 neighbor solicitation.

FIG. 4 is a flow chart showing another exemplary embodiment of an implementation of an application 400, which uses Address Resolution Protocol (ARP) to resolve the conflict between IPsec and IPv6 neighbor solicitation. It can be appreciated that hosts and/or devices as described above, will include an Ethernet layer, which includes MAC-IDs for both the source host (i.e., HOST A) and a destination host (HOST B) and having the following structure:

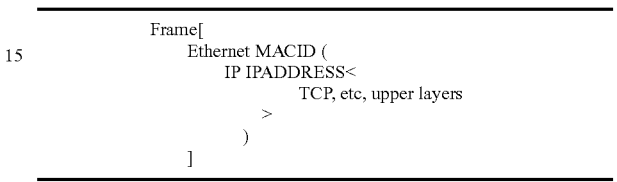

In step 420, the ARP table is populated. It can be appreciated that before any IPv4 communication occurs, ARP ("arp" or "<arp>") messages must be exchanged in order to obtain the MAC-ID for the Ethernet destination layer. The following is an example of the MS-DOS <arp> command which is displayed within the arp tables:

C:/arp -a, Interface: 20.0.0.5 --- 0x50004 ←HOST A,
Internet Address Physical Address, Type
20.0.0.3, 00-10-4b-69-ae-47, dynamic←HOST B.

In accordance with an exemplary embodiment, before 20.0.0.5 talks to 20.0.0.3, ARP packages are exchanged and a table entry for the Ethernet destination layer is created.

In step 430, an administrator creates a security policy (or security policies) for exchange between hosts (i.e., source host and destination hosts). For example, one of the security policies can be: [Any packets going out from fe80::211:2ffffe72:3ad5 to fe80::210:4bff:fe69:ae47 must be (encrypted) protected by a security association in the following way]: spdadd fe80::211:2fff:fe72:3ad5 fe80::210:4bff:fe69:ae47 any -P out ipsec, esp/transport//require.

In step 440, IPsec starts, however, in order for IPsec to create security associations and send IPv6 packages from HOST A to HOST B, on HOST A, the Ethernet layer will need a MAC-ID for HOST B, however, HOST A will not have a neighbor cache which relates fe80::210:4bfffe69:ae47 to 00-10-4b-69-ae-47. Thus, since the IPv6 protocol has Neighbor Discovery (its own implementation of ARP) it will create a Neighbor Solicitation message, which will not leave HOST A since it cannot be protected, i.e., a security association is needed. So automatically, the IPsec communication will fail.

In step 450, in accordance with an exemplary embodiment, an application on HOST A, which uses Address Resolution Protocol (ARP) to resolve the conflict between IPsec and IPv6 neighbor solicitation starts, and extracts the MAC-ID from the security association. For example, fe80::210:4bfffe69:ae47->fe80::210:4b:ff:fe69:ae47->00: 10:4b:69:ae:47. However, it can be appreciated that a MAC-ID (for HOST B) can be extracted from standard IPv6 addresses, global and/or link local addresses.

In step 460, the application will search the ARP table for a match of 00:10:4b:69:ae:47. In an optional step, HOST A can send an ARP message to HOST B to obtain and/or confirm the MAC ID of HOST B.

In step 480, if a match of 00:10:4b:69:ae:47 is found, the application creates a neighbor cache entry, as follows:

| Neighbor cache | |
| --- | --- |
| Internet Address | Physical Address |
| fe80::210:4b:ff:fe69:ae47 | 00-10-4b-69-ae-47 |

In step 490, the application restarts IPsec, which provides the protocol suite for securing Internet Protocol (IP) communications by authenticating and encrypting each IP packet of a data stream between HOST A and HOST B. In addition, IPsec also includes protocols for establishing mutual authentication between agents at the beginning of the session and negotiation of cryptographic keys to be used during the session.

In accordance with an exemplary embodiment, internally inside the IPv6 network stack while constructing the packages to enable the security associations will include:

IPsec—Constructed a package to be sent to fe80::210:4b:ffife69:ae47

Ethernet layer—Where is fe80::210:4b:ffife69:ae47?

Neighbor cache—Here fe80::210:4b:ffife69:ae47 is at 00-10-b-69-ae-47

In accordance with an optional step, the application can erase the temporal Neighbor Cache entries upon the establishment of the IPv6 communication between HOST A and HOST B.

In accordance with another exemplary embodiment, a computer readable medium containing a computer program for neighbor discovery for an IPv6 communication network, wherein the computer program comprises executable instructions for: extracting a Media Access Control identifier (MAC ID) for a target host from a security policy for an IPv6 address for the target host; searching for the MAC ID of the target host in an Address Resolution Protocol (ARP) table on a source host; upon locating the MAC ID of the target host, creating a temporal neighbor cache entry in a neighbor cache table for the target host; and enabling a security association between the source host and the target host based on the temporal neighbor entry in the neighbor cache table, which allows IPv6 communications to be exchanged between the target host and the source host.

The computer readable medium, of course, may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of enabling host devices having an IPsec policy to communicate with one another via an IPv6 communication network, comprising:
    extracting a Media Access Control identifier (MAC ID) for a target host from a security policy for an IPv6 address for the target host;
    searching for the MAC ID of the target host in an Address Resolution Protocol (ARP) table on a source host;
    upon locating the MAC ID of the target host, creating a temporal neighbor cache entry in a neighbor cache table for the target host;
    enabling a security association between the source host and the target host based on the temporal neighbor entry in the neighbor cache table, which allows IPv6 communications to be exchanged between the target host and the source host;
    forwarding an Address Resolution Protocol (ARP) request to the target host, the ARP request having a Media Access Control Identifier (MAC ID) associated with the source host;
    receiving the ARP request on the target host;
    comparing the MAC ID of the source host with a local ARP table associated with the target host; and
    if the MAC ID of the source host matches a MAC ID on the local ARP table of the target host, creating a temporal neighbor cache entry in a neighbor cache table associated with the target host.

2. The method of claim 1, wherein the step of enabling the security association between the source host and the target host based on the temporal neighbor entry in the neighbor cache table associated with each of the hosts further comprises:
    forwarding an ARP response to the source host;
    receiving the ARP response on the source host;
    comparing the MAC ID of the target host with a local address resolution protocol (ARP) table associated with the target host; and
    if the MAC ID from the source host matches a MAC ID on the ARP table of the target host, enabling the security association between the source host and the target host based on the temporal neighbor entries in the neighbor cache table associated with each of the hosts.

3. The method of claim 1, wherein the step of enabling the security association further comprises:
    initiating an IPsec negotiation between the source host and the target host based on the security association between the source host and the target host.

4. The method of claim 1, establishing an IPv6 connection between the source host and the target host.

5. The method of claim 4, upon establishing the IPv6 connection between the source host and the target host removing the temporal neighbor cache entry in the neighbor cache table from the source host and/or target host.

6. The method of claim 1, wherein the temporal neighbor cache entry allows the source host and target host to exchange IPv6 packets within an IPv6 network protocol, which includes authentication and encryption of each IP packet of a data stream.

7. The method of claim 6, wherein an IPv6 address of the source host and the target host are configured automatically using a stateless address autoconfiguration.

8. The method of claim 1, wherein the step of forwarding the ARP request to the target host comprises:
    retrieving the Media Access Controller Identifier (MAC ID) from the Address Resolution Protocol (ARP) table;

converting the MAC ID of the source host into an encapsulated ARP data packet; and broadcasting the encapsulated ARP data packet to the target host.

9. The method of claim 1, wherein the target host is at least two or more target hosts.

10. The method of claim 1, further comprising an application on the source host and/or the target host, wherein the application captures incoming IPv6 packets having an IPv6 address before the IPv6 packet is received within an Internet layer within the source host and/or the target host.

11. The method of claim 10, wherein the application is running on an operating system of the source host and the target host.

12. The method of claim 1, wherein the IPv6 address is a globally-unique address formed from a network prefix provided to the source host and the target host by a router, combined with the MAC ID as generated in forming a link-local address for the target host.

13. The method of claim 1, wherein at least one of the source host and/or the target host is an image forming apparatus.

14. A system of neighbor discovery for an IPv6 communication network, comprising:
    a source host having an application which performs the following steps:
        extracting a Media Access Control identifier (MAC ID) for a target host from a security policy for an IPv6 address for the target host;
        searching for the MAC ID of the target host in an Address Resolution Protocol (ARP) table on a source host;
        upon locating the MAC ID of the target host, creating a temporal neighbor cache entry in a neighbor cache table for the target host; and
        forwarding an Address Resolution Protocol (ARP) request to the target host, the ARP request having a Media Access Control Identifier (MAC ID) associated with the source host; and
    a target host having an application, which performs the following steps:
        receiving the ARP request on the target host;
        comparing the MAC ID of the source host with a local ARP table associated with the target host; and
        if the MAC ID of the source host matches a MAC ID on the local ARP table of the target host, creating a temporal neighbor cache entry in a neighbor cache table associated with the target host.

15. The system of claim 14, further comprising:
    enabling a security association between the source host and the target host based on the temporal neighbor entries in the neighbor cache table associated with each of the hosts.

16. The system of claim 15, wherein the step of enabling a security association between the source host and the target host based on the temporal neighbor entry in the neighbor cache table associated with each of the hosts comprises:
    forwarding an ARP response to the source host;
    receiving the ARP response on the source host;
    comparing the MAC ID of the target host with a local address resolution protocol (ARP) table associated with the target host; and
    if the MAC ID from the source host matches a MAC ID on the ARP table of the target host, enabling the security association between the source host and the target host based on the temporal neighbor entries in the neighbor cache table associated with each of the hosts.

17. The system of claim 16, further comprising initiating an IPsec negotiation between the source host and the target host based on the security association between the source host and the target host.

18. A non-transitory computer readable medium containing a computer program for neighbor discovery for an IPv6 communication network, wherein the computer program comprises executable instructions for:
    extracting a Media Access Control identifier (MAC ID) for a target host from a security policy for an IPv6 address for the target host;
    searching for the MAC ID of the target host in an Address Resolution Protocol (ARP) table on a source host;
    upon locating the MAC ID of the target host, creating a temporal neighbor cache entry in a neighbor cache table for the target host;
    enabling a security association between the source host and the target host based on the temporal neighbor entry in the neighbor cache table, which allows IPv6 communications to be exchanged between the target host and the source host;
    forwarding an Address Resolution Protocol (ARP) request to the target host, the ARP request having a Media Access Control Identifier (MAC ID) associated with the source host;
    receiving the ARP request on the target host;
    comparing the MAC ID of the source host with a local ARP table associated with the target host; and
    if the MAC ID of the source host matches a MAC ID on the local ARP table of the target host, creating a temporal neighbor cache entry in a neighbor cache table associated with the target host.

19. The non-transitory medium of claim 18, wherein the step of enabling the security association between the source host and the target host based on the temporal neighbor entry in the neighbor cache table associated with each of the hosts further comprises:
    forwarding an ARP response to the source host; receiving the ARP response on the source host;
    comparing the MAC ID of the target host with a local address resolution protocol (ARP) table associated with the target host; and
    if the MAC ID from the source host matches a MAC ID on the ARP table of the target host, enabling the security association between the source host and the target host based on the temporal neighbor entries in the neighbor cache table associated with each of the hosts.

* * * * *